3,261,886
LIQUID POLYESTER COMPOSITIONS CONTAINING A MAJOR AMOUNT OF METHYL METHACRYLATE
John R. Lowry, Levittown, Pa., assignor to Rohm & Haas Company, Philadelphia, Pa., a corporation of Delaware
No Drawing. Filed June 11, 1962, Ser. No. 201,327
3 Claims. (Cl. 260—862)

The present invention relates to resin compositions suitable for use in forming laminates or moldings containing glass fiber reinforcement among other things. In particular, it relates to compositions which as normally supplied to the user comprise three components and which when used normally comprise four components. Still more particularly, such compositions as normally supplied comprise a mixture of methyl methacrylate, a polyester containing $\alpha,\beta$-ethylenic unsaturation, and a polymer, in ratios within the ranges hereinafter set forth. To this composition as supplied there is added prior to use another monomer or mixture of monomers, preferably styrene or vinyl toluene, or mixtures of one or both with another monomer such as methyl, ethyl or butyl acrylate plus a catalyst, and/or other additives normally used to effect cure, coloring when desired, and the like. Laminates formed with such compositions also comprise a part of this invention.

Resin compositions used in forming glass fiber laminates heretofore known have inherent deficiencies in that the resulting laminates lack clarity and show substantial surface erosion and rupture of the resin-to-glass interfacial bond when subjected to weathering. This invention overcomes these deficiencies in substantial respects.

In accordance herewith the components of the composition as supplied are usually within the ranges as follows: methyl methacrylate in amounts of about 50 to about 80 parts by weight, polyester in amounts of about 5 to about 25 parts by weight, and polymer or copolymer in amounts of about 12 to about 45 parts by weight.

As the polyester component there may be used polyesters containing $\alpha,\beta$-ethylenic unsaturation to the extent of about 6 to about 50 mol percent and preferably about 25 mol percent. Such polyesters, as is well understood, comprise a condensation product of a polyhydric alcohol and an $\alpha,\beta$-ethylenically unsaturated polycarboxylic acid. Typical of such polyesters are poly(dipropylene maleate) and poly(propylene phthalate/maleate) containing phthalate and maleate in a mole ratio within the range of about 40 to about 60 parts to about 60 to about 40 parts.

As the polymeric component there may be used polymeric methyl methacrylate or copolymers of methyl methacrylate in preponderance and minor amounts of other monomers containing a single vinylidene group copolymerizable therewith, such as styrene, ethyl acrylate, and the like. Such polymers are soluble in the mixture of monomers referred to above.

Such resin compositions as normally supplied usually have viscosities within the range of about 2000 to about 2500 centipoises at 25° C. When used, for example, to form laminates with mats of glass fiber, the compositions are customarily diluted with styrene, vinyl toluene, methyl, ethyl and butyl acrylate, or the like to a viscosity of about 190 to about 300 centipoises at 25° C.

To illustrate the invention more fully, the following examples are given wherein the parts specified are by weight:

EXAMPLE 1

Resin as supplied:

|   | Parts |
|---|---|
| (a) Poly(propylene/phthalate/maleate [2/1/1 mole ratio]) | 25 |
| (b) Methyl methacrylate/styrene (65/35 wt. ratio) copolymer | 16.5 |
| (c) Methyl methacrylate monomer | 58.5 |

This resinous composition is a high viscosity syrup (2000–2500 cps.). This is the preferred way of supplying the resin because (a) the resin solution without styrene (or like monomer) is more stable under conditions of shipping, storage and manufacture, and (b) addition of the monomer(s) by the laminator facilitates the addition of dyes, catalysts and/or other additives used to effect cure of the laminated structure and its aesthetic worth, and (c) the laminator can more economically add the dilution monomer.

Resin for use in laminating:

|   | Parts |
|---|---|
| (a) Above resin as supplied | 80 |
| (b) Styrene monomer | 20 |
| (c) Benzoyl peroxide | 0.5 |

The laminating resin at use viscosity of 190–300 cps. was obtained by diluting the resin as supplied with the appropriate monomer. This supplied resin when diluted for use provides (a) a better refractive index match to the glass, (b) improved durability over the poly(propylene/maleate/phthalate [2/1/1 mole ratio])/MMA monomer/styrene monomer resin of Example 2, (c) resistance to rupture of internal resin/glass fiber interfacial bond, and (d) excellent reactivity, equivalent to that obtained with cross-linking monomers, such as 1,3-butanediol dimethacrylate or ethylene glycol dimethacrylate used in acrylic syrups, without the inherent disadvantages of internal fiber blooming.

This resin was prepared for laminating by dissolving the benzoyl peroxide (c) in styrene (b) and then adding resin (a) and throughly mixing all components. The prepared resin was flash degassed before use. A laminate was prepared using methods common to the art relative to impregnation and cure. Chopped strand glass fiber mat was used as reinforcement, and the impregnated assembly was sheathed in cellophane, confined between forming metal cauls and cured by conventional means.

EXAMPLE 2

|   | Parts |
|---|---|
| (a) Poly(propylene/maleate/phthalate [2/1/1 mole ratio]) | 60 |
| (b) MMA monomer | 20 |
| (c) Styrene monomer | 20 |
| (d) Benzoyl peroxide | 0.5 |

The commercial resinous composition was supplied as a blend of components (a) and (b) in a 75/25 weight ratio and combined with components (c) and (d) for use.

A glass fiber laminate was prepared as in Example 1.

EXAMPLE 3

| | Parts |
|---|---|
| (a) Poly(methyl methacrylate) of molecular weight about 100,000 | 31.8 |
| (b) MMA monomer | 59.4 |
| (c) Ethylene glycol dimethacrylate | 8.8 |
| (d) Benzoyl peroxide | 0.5 |

A glass fiber laminate was prepared as in Example 1.

EXAMPLE 4

| | Parts |
|---|---|
| (a) Copolymer of MMA and styrene at 65/35 weight ratio (molecular weight is about 120,000) | 25 |
| (b) MMA monomer | 45 |
| (c) 1,3-butanediol dimethacrylate | 10 |
| (d) Styrene monomer | 20 |
| (e) Benzoyl peroxide | 0.5 |

A glass reinforced laminate was prepared as in Example 1.

The table below shows the durability characteristics of the resulting glass mat laminates when exposed to outside weather in Miami, Florida, for 12 months.

Table

| | Example 1 | Example 2 | Example 3 | Example 4 |
|---|---|---|---|---|
| Percent White Light Transmission: | | | | |
| Original | 72 | 81 | 60 | 71 |
| 12 months | 70 | 75 | 55 | 51 |
| Percent Retention | 97 | 93 | 92 | 72 |
| Fiber Prominence [1]: | | | | |
| 12 months | 2 | 3 | 6 | 6 |

[1] Ratings: 0—none; 2—slight; 3—some; 6—bad.

As is evident from the above table, glass laminates formed with resin compositions as herein disclosed show a combination of properties in substantial respects superior to laminates formed with commercially available all acrylic resin syrups and polyester resin compositions. In particular, it will be noted that the laminate of Example 1 has a combination of better white light transmission retention and lack of development fiber prominence than laminates formed by using the resins as shown by the other examples. Changes in surface gloss and in color were in general better with the laminate of Example 1 than with the laminates of the other examples.

I claim:

1. A liquid resinous composition which comprises by weight (a) methyl methacrylate in amounts of about 50 to about 80 parts, (b) a condensation product of an $\alpha,\beta$-ethylenically unsaturated polycarboxylic acid and a polyhydric alcohol in amounts of about 5 to about 25 parts, and (c) a polymer soluble in (a) from the group consisting of polymethyl methacrylate and copolymers of methyl methacrylate in preponderance and minor amounts of another monomer containing a single vinylidene group copolymerizable therewith, in amounts of about 12 to about 45 parts.

2. A composition as in claim 1 having a viscosity within the range of about 2000 to about 2500 centipoises at 25° C.

3. A composition as in claim 2 diluted with at least one monomer from the group consisting of styrene, vinyl toluene, methyl acrylate, ethyl acrylate, and butyl acrylate to a viscosity of about 190 to about 300 centipoises at 25° C.

References Cited by the Examiner

UNITED STATES PATENTS

| 2,464,568 | 3/1949 | Flynn et al. | 260—872 |
| 2,482,086 | 9/1949 | Foster | 204—242 |
| 2,757,160 | 7/1956 | Anderson | 260—862 |
| 2,916,469 | 12/1959 | Lal | 260—862 |
| 3,051,679 | 8/1962 | Forsyth | 260—863 |

FOREIGN PATENTS

| 828,894 | 2/1960 | Great Britain. |

WILLIAM H. SHORT, *Primary Examiner.*

LOUISE P. QUAST, *Examiner.*

C. A. WENDEL, *Assistant Examiner.*